UNITED STATES PATENT OFFICE.

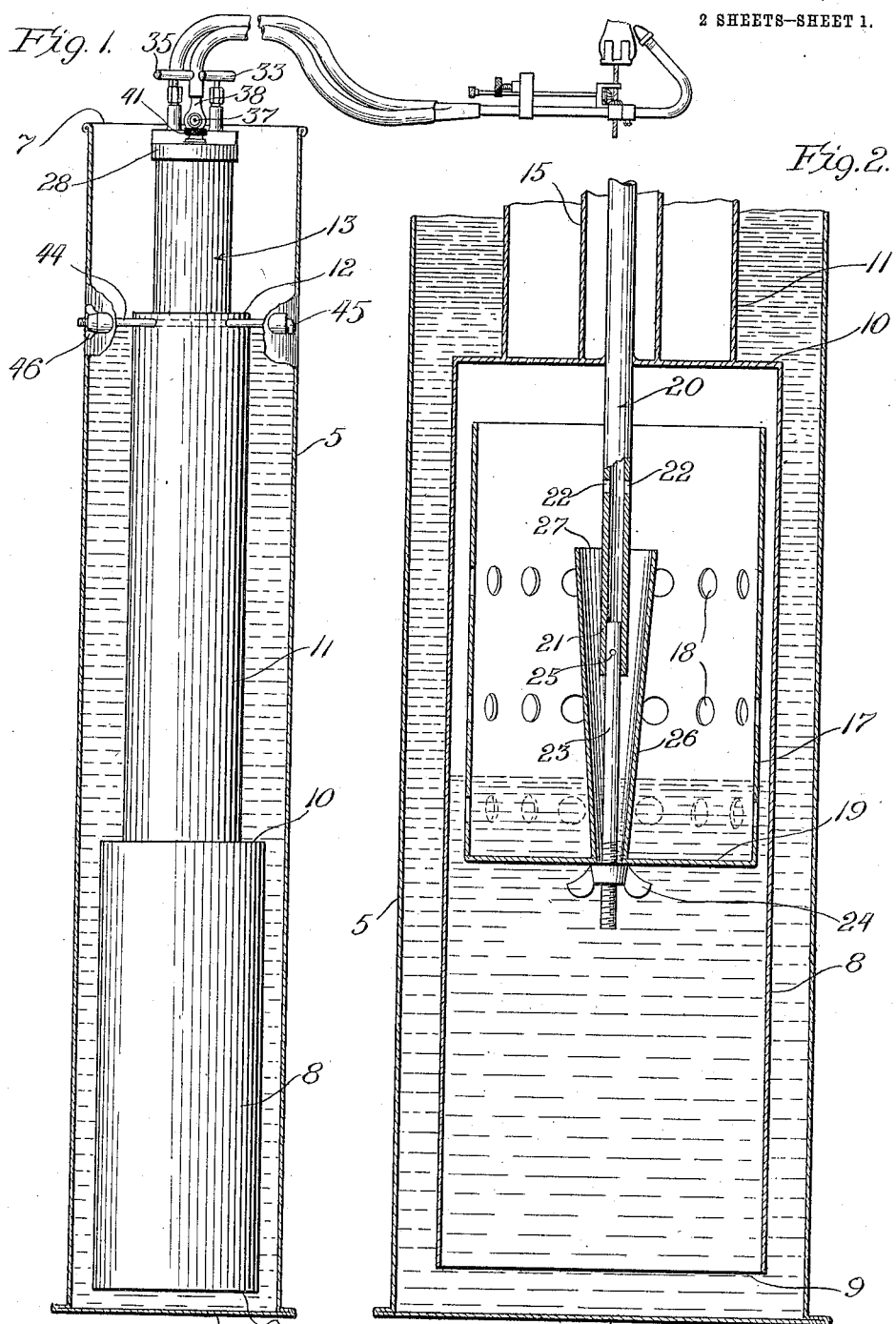

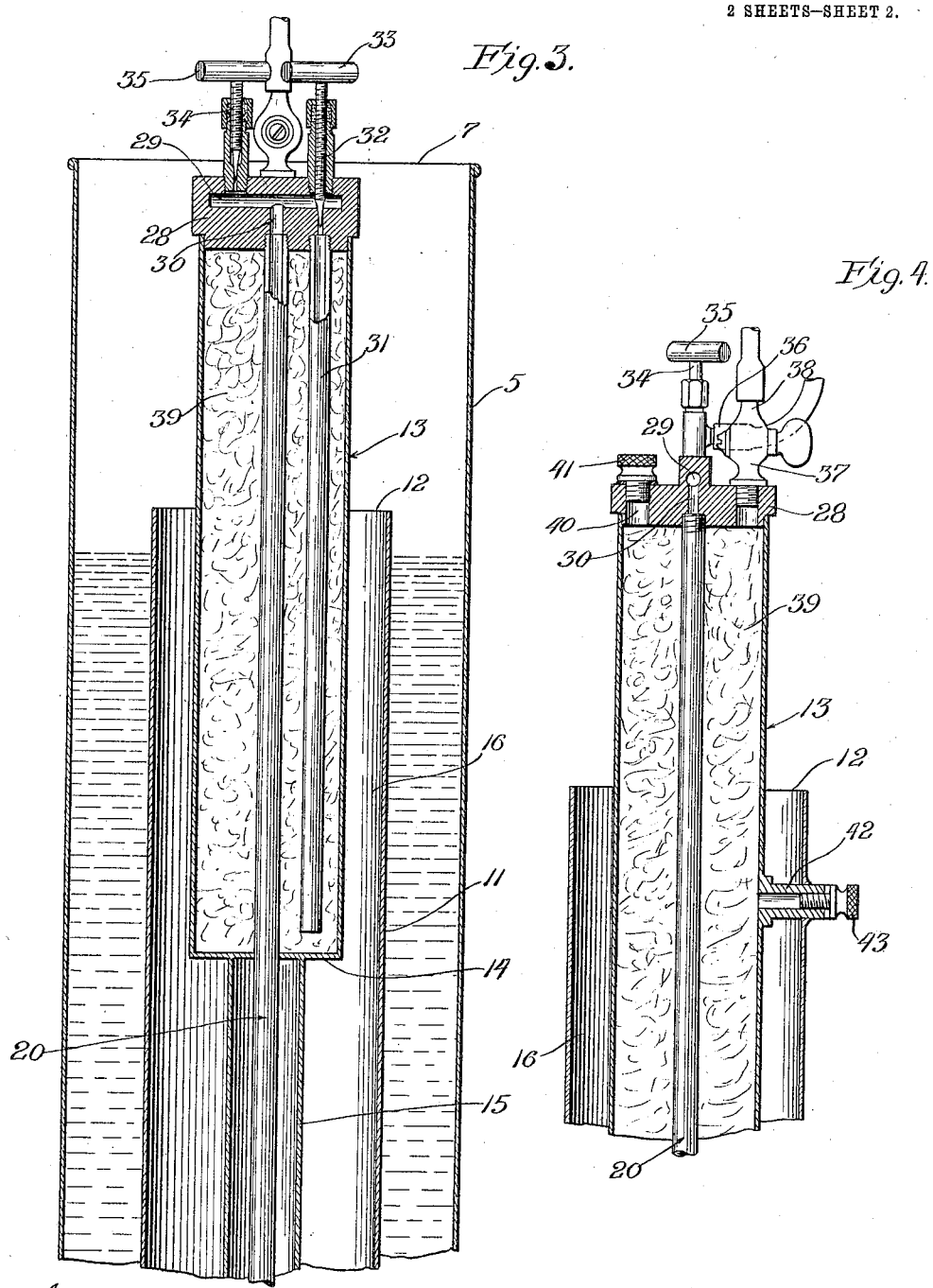

THOMAS H. ARMSTRONG, OF CHICAGO, ILLINOIS, ASSIGNOR TO JOSEPH M. BERNSTEIN AND SOLOMON COHEN, OF CHICAGO, ILLINOIS, A COPARTNERSHIP DOING BUSINESS AT CHICAGO, ILLINOIS, UNDER THE FIRM-NAME AND STYLE DEARBORN NOVELTY COMPANY.

GAS-GENERATOR.

1,076,401.   Specification of Letters Patent.   Patented Oct. 21, 1913.

Application filed April 14, 1913. Serial No. 761,022.

*To all whom it may concern:*

Be it known that I, THOMAS H. ARMSTRONG, a citizen of the United States, residing at Chicago, in the county of Cook and State of Illinois, have invented certain new and useful Improvements in Gas-Generators, of which the following is a specification.

The present invention relates to certain improvements in gas generators intended particularly for use in the manufacture of gas for stereopticons and the like. It will presently appear, however, that the mechanisms and constructions disclosed herein can be used for the manufacture of gas for any other desired purpose.

The invention relates more particularly to a mechanism in which oxygen is generated by the combining of a suitable compound with water. A portion of such oxygen is used directly in the burner, while another portion is passed through some other re-agent for the purpose of combining with the same to produce a combustible gas. This combustible gas in turn flows to the burner to there unite with the first mentioned portion of the oxygen for the production of the flame. Apparatus of this general type are at present known and used in the art.

As a general rule, apparatus of the above mentioned type depend for the generation of the oxygen upon the chemical union or combination of certain compounds with water with a resulting liberation of the oxygen. This chemical reaction generates a certain amount of heat, the amount depending of course upon the particular compound used and upon the rate at which the reaction is carried forward. Apparatus of the above mentioned type generally depend for the production of the combustible gas upon the chemical union or reaction of oxygen and ether, or other re-agent. This reaction results in a cooling of the reagents, inasmuch as ether, in evaporating, absorbs a considerable amount of latent heat of evaporation. I am familiar with certain constructions of apparatus depending, in a general way, upon the reactions above mentioned for the production of the combustible gas, but in such constructions the ether mixer, or carbureter, as it is generally called, is placed outside of and separated from the chamber or inclosure within which the generation of the oxygen is proceeding. Such an arrangement presents the serious disadvantage that the carburation of the gas does not proceed uniformly. This is because such carburation is largely dependent upon the temperature of the carbureter and upon the rate of demand for the combustible gas. When the action of the device is not uniform, the quality and illuminating power of the gas fluctuates seriously.

The main object of the present invention is to so relate, associate, or combine the carbureter with the oxygen generating chamber that the heat which is liberated by the generating of the oxygen, or at least a portion of such heat, may be used for the purpose of heating the carbureter to compensate and make up for the heat which is absorbed in the form of latent heat of evaporation. Furthermore by so arranging the parts the carbureter is protected from fluctuations of outside temperature, and the operation of the device will proceed much more uniformly and evenly with the result that the quality and value of the combustible gas will be greatly improved. At the same time that the above advantages are secured, the distance which the oxygen must travel from the oxygen generator to the carbureter is greatly reduced, so that a quicker and more direct action is secured, and so that the heat contained in the newly generated oxygen is better conserved.

In order to control the proportion of combustible gas and oxygen which are delivered to the burner, it is necessary to place valves of some kind in the passages for these gases. For example, if a richer gas is desired at the burner, the percentage of the total oxygen which is diverted through the carbureter must be increased, and vice versa.

Another object of the present invention is to associate the necessary valves with the remaining mechanisms in the simplest and most direct manner possible so that the illuminating quality of the gas, and the action at the burner, can be most perfectly controlled.

Other objects and uses will appear from a detailed description of the invention which consists in the features of construction and combinations of parts hereinafter described and claimed.

In the drawings: Figure 1 shows a vertical section through the water tank, the oxygen generator, carbureter, and associated elements being shown in elevation, and a burner being shown as connected to the generator; Fig. 2 shows an enlarged vertical section through the lower portion of the assembled apparatus, showing particularly the construction of the oxygen generator and the lower end of the delivery tube; Fig. 3 shows a vertical section through the upper portion of the assembled apparatus, being in reality an extension of Fig. 2, and it shows in detail the arrangement of the carbureter, mixing valves, etc.; and Fig. 4 shows a detail section through the upper portion of the carbureter at right angles of the section shown in Fig. 3.

In general construction the completed device comprises an upright water tank or the like 5, closed at its lower end 6, and preferably open at its upper end 7 for the introduction of water, and for the introduction and removal of the various elements in the water tank. Within this water tank there is placed an inverted gas tank 8 which has its lower end 9 open and sustained at a slight distance from the lower end 6 of the water tank. To the upper end 10 of the gas tank there is connected an upstanding circular wall 11 which has is upper end 12 open and terminating at a slight distance above the maximum water level of the tank 5.

Within the upstanding wall 11 there is placed a carbureter 13 which, as shown in Fig. 3, preferably has its lower end 14 sustained some distance above the upper end 10 of the gas tank, being supported upon a vertical tube member 15, as shown particularly in Fig. 3. The upstanding wall 11 is preferably of somewhat greater diameter or size than the carbureter, so as to leave a space 16 between the two, thereby preventing the water from coming into direct contact with the carbureter. The desirability of providing this space 16 arises from the fact that, as a general rule, more heat is generated by the liberation of oxygen than is absorbed by that portion of the oxygen which mixes with the ether of the carbureter, so that if the water were allowed direct contact with the carbureter the latter might be heated to a greater extent than desired. Of course, the size of the space 16, and in fact its desirability at all, is dependent largely upon the amount of heat generated during the liberation of the oxygen as compared to the amount of heat absorbed by the carbureter, and, therefore, the size of this space 16 should correspond to the particular requirements. There might even arise occasions when it could properly be dispensed with entirely.

Within the gas tank there is mounted or supported a container 17, which is preferably foraminated by the provision of the perforations 18. This container 17 is for the purpose of supporting suitable chemical, such as a compound of sodium dioxid, which will combine with water to generate the oxygen. The lower end 19 of the container is preferably unperforated so that it will retain and sustain any ash or other sediment resulting from the chemical reaction. A tube 20 has its lower end 21 terminating within the upper end of the gas tank, and is provided with a number of perforations 22 in its side walls, which perforations permit of the admission of oxygen into the tube. For the purpose of sustaining the container near the upper end of the gas tank, and for providing a removable construction, I have extended a rod 23 downward from the lower end of the tube 20, the lower end of said rod extending through the container and being threaded to receive a wing-nut or the like 24 by means of which the container is sustained in the proper position. The rod may be conveniently connected to the tube as by means of a pin or the like 25. The above construction is adopted for the purpose of permitting the container to be easily inserted into or withdrawn from the upper end of the gas tank. The insertion and removal of the container are necessitated by reason of the necessity of inserting new chemical into it from time to time, and by reason of the necessity of cleaning it out after a charge of chemical has been used. For the purpose of guiding the rod 23 through the perforation in the lower end of the container, and for the purpose of preventing access of water to the interior of the container through such perforation, I have secured a conical guide or the like 26 to the bottom of the container and around the perforations thereof. This guide, by reason of its conical formation, serves to direct the rod through the perforation of the container without care or attention on the part of the operator. The upper edge 27 of this conical guide preferably terminates at a sufficent elevation within the container to prevent the access of water to the container except through the perforations 18. The desirability of this construction will presently appear.

The tube 20 extends upward within the sustaining wall 15, and preferably through the carbureter to the upper end thereof, where it is connected to a cap or the like 28 which closes the upper end of the carbureter. This cap is provided with a transversely extending gas passage 29, which passage communicates with the tube 20 by means of a vertical connection 30, so that the up-flowing gas coming from the gas generator is delivered directly to the passage 29. A tube 31 extends downwardly from the cap 28 and communicates with the transverse passage 29, said tube 31 having its lower end terminating within and near the lower end of the carbureter. This tube is for the purpose of delivering a portion of the oxygen into the carbureter, where it will combine or mix with the re-agent therein contained to produce the combustible gas. For the purpose of controlling the supply of oxygen down through the tube 31 I have placed a needle valve 32 in the cap, said needle valve having the handle 33 by means of which it may be turned to accurately control the supply of oxygen to the carbureter, as above stated. Another needle valve 34 having the handle 35 is connected into the cap and serves to control the supply of oxygen from the passage 29 to a nipple or the like 36, from which nipple flows that portion of the oxygen which is to pass directly to the burner without first passing through the carbureter. As shown in Fig. 4 a cock or the like 37 is connected into the cap 28, said cock serving to control the delivery of carbureted gas from the upper portion of the carbureter to a nipple 38 from which the carbureted or combustible gas flows to the burner.

As a general proposition the carbureter should first be filled with some absorbent body, such as cotton, or the like, and therefore I have illustrated the carbureter as being filled with the body of cotton 39. An opening 40 in the cap gives access to the interior of the carbureter for the purpose of introducing the ether or the like, said opening being normally closed by a cap screw 41. In order to give an indication as to the proper amount of ether which should be introduced into the carbureter, I have carried a nipple or the like 42 out from the carbureter at the desired elevation, said nipple extending through the upstanding wall 11 and being normally closed by means of a cap-screw 43.

On account of the presence of the gas within the upper portion of the gas tank 8, and within the carbureter, and on account of the presence of air within the space 16 inclosed by the upstanding wall 11, the devices will have a certain buoyancy which will tend to raise them up to a higher level in the water tank 5. In previous devices of this class in which the carbureter is not mounted upon the gas tank, the buoyancy has been so large as to raise the devices in the manner above stated. For this reason, in previous constructions, it has been necessary to provide some device or mechanism for the purpose of holding the gas tank down, so that it will remain properly submerged within the water of the tank 5. In the construction herein disclosed, the additional weight of the carbureter will generally be sufficient to hold down the gas tank, so that, as a general rule, it will not be necessary to provide any other device for accomplishing this result. This is an advantage for the reason that the parts can be more readily manipulated when their weight is sufficient to overcome the buoyancy. It will be noted, however, that the turning of the handles 33 and 35 of the gas needle valves will tend to rotate the entire structure within the water tank. On account of this fact, some means must be provided for retaining the gas tank and connected structures against such rotation. For this purpose, I have provided means for connecting the structures to the water tank 5 so as to prevent any relative rotation between them. In the particular arrangement illustrated, such means comprises a rod 44 extended through perforations of the water tank 45 and through the upper portion of the upstanding wall 11. In order to reduce the cost of construction as much as possible, this rod extends through the upstanding wall 11 and through the space 16 contained between said wall and the carbureter, so that the rod does not enter the carbureter itself. In order to hold the rod in position, I prefer to bend one of its ends down to provide a hook 45 and to thread the other end for the reception of a wing-nut 46. By tightening up the wing-nut the bent portion 45 will be drawn tightly against the opposite side of the tank 5, so as to hold the rods securely in position.

Although, as stated above, the additional weight imposed by the carbureter will generally be sufficient to hold the gas tank down in the proper position within the water tank, and although the primary function and object of providing the rod 44 is to prevent a possible rotation of the various devices contained within the water tank, still in case of necessity the rod 44 will prevent the devices from rising within the water tank, and will also, if necessary, sustain them with the necessary force to retain the lower edge 9 of the gas tank a slight distance above the bottom 6 of the water tank.

As a general proposition, in using the apparatus herein disclosed, the foraminated container should first be filled with the desired amount of chemical, and should then be connected up into the upper end of the gas tank by means of the wing-nut 24. Thereafter the gas tank, including the upstanding wall 11, and the carbureter and associated parts should be set down into the water tank. Water may then be flowed into the water tank, care being taken to prevent the entrance of water into the upstanding wall 11, until the level of the water approaches the upper edge 12 of said upstanding wall. On account of the presence of the air and gas entrapped within the gas tank, the water will rise to a certain level within the same whereupon a balance will be established. In case the water has not risen to the lower row of holes in the foraminated container, air may be allowed to flow out by way of the valve 34, or by way of the valve 37, until the water does finally enter the foraminated container. Thereupon the water will come into contact with the compound and oxygen will be generated. As soon as this takes place, the pressure within the gas tank will rise, and the water will be forced back away from the compound and will remain in such position until a certain amount of oxygen has been drawn off. When this takes place another portion of water will enter the container, and a new portion of gas will be generated. Thus the contact of the water with the compound will be controlled by the rapidity with which the oxygen is withdrawn or allowed to escape.

While I have herein discussed my invention as being used in connection with the generation of oxygen, and in connection with the carbonization of oxygen by means of ether to produce a combustible gas, still I in no wise limit myself to the use of oxygen, or to the use of ether, except as called for in the claims, for it is apparent that many other gases and compounds or re-agents might be substituted and used. Furthermore I do not limit myself to the construction herein shown and described, except as called for in the claims, but I contemplate within the scope of my invention any arrangement of parts, whereby the heat generated by the liberation of the oxygen or other gases may be conserved and applied to the ether or other carbureter, either directly or indirectly for the purposes and uses hereto set forth.

I claim:

1. In a device of the class described, the combination with a water tank, of a gas generator mounted within the lower portion of the same, a carbureter mounted within the water tank at a point above the gas generator, and a gas passage leading from the gas generator to the carbureter, whereby the water contained within the water tank serves to protect the carbureter from inequalities and variations of temperature, substantially as described.

2. In a device of the class described, the combination with a water tank, of a gas generator mounted within the lower portion of the same, a carbureter mounted within the water tank at a point above the gas generator, a gas passage leading from the gas generator upward through the carbureter to the upper end thereof, and a gas passage leading from said upper end downward into the carbureter, whereby the water within the water tank serves to protect the carbureter against inequalities or changes in temperature, substantially as described.

3. In a device of the class described, the combination with a water tank, of a gas generator mounted within the same, a carbureter mounted within the water tank, and a gas passage leading from the gas generator to the carbureter, whereby the water of the water tank serves to protect the gas generator from inequalities or changes in temperature, substantially as described.

4. In a device of the class described, the combination with a water tank, of an oxygen generator and a carbureter mounted within the same, and a gas passage leading from the oxygen generator upwardly to the carbureter, whereby heat liberated during the generation of the oxygen serves to heat the water of the water tank to in turn heat the carbureter and to compensate for cooling in the same due to the evaporation, substantially as described.

5. In a device of the class described, the combination with a water tank, of a gas generator mounted within the same, a carbureter mounted within the water tank, a gas passage leading from the gas generator to the carbureter, and an inclosing wall interposed between the carbureter and the water of the water tank and spaced away from the carbureter to provide an air space, whereby the water is insulated from direct contact with the carbureter, substantially as described.

6. In a device of the class described, the combination with a water tank, of a gas generator mounted within the lower portion of the same, a carbureter mounted within the water tank at a point above the gas generator, a gas passage leading from the gas generator to the carbureter, and an upstanding wall surrounding the carbureter and serving to protect the same from direct contact with the water of the water tank, substantially as described.

7. In a device of the class described, the combination with a water tank, of a gas tank mounted within the lower portion of the same, a carbureter mounted within the water tank and connected to the upper portion of the gas tank, a gas passage leading from the gas tank to the upper portion of the carbureter, valves in the upper portion of the carbureter for controlling the flow of gases from the gas tank and to the carbureter, and means for retaining the carbureter and gas tank against rotation within the water tank, substantially as and for the purpose set forth.

THOMAS H. ARMSTRONG.

Witnesses:
Thomas A. Banning, Jr.,
Wm. P. Bond.